United States Patent [19]

Asai et al.

[11] Patent Number: 5,446,082

[45] Date of Patent: Aug. 29, 1995

[54] WATER-DISPERSIBLE POLYESTER COMPOSITION FOR IMAGE RECORDING MEDIUM

[75] Inventors: Haruo Asai; Mitsuru Kuwahara; Nobukazu Kotera, all of Ohtsu, Japan

[73] Assignee: Toyo Boseki Kabushiki Kaisha, Osaka, Japan

[21] Appl. No.: 57,265

[22] Filed: May 4, 1993

[30] Foreign Application Priority Data

May 8, 1992 [JP] Japan .................... 4-116035
Feb. 12, 1993 [JP] Japan .................... 5-024271

[51] Int. Cl.$^6$ .................. C08J 5/02; C08K 3/20; C08K 5/05; C08L 67/00
[52] U.S. Cl. ................... 524/389; 524/376; 524/385; 524/601; 524/604; 524/608; 524/609
[58] Field of Search ......... 523/414; 524/376, 385, 524/389, 513, 539, 601, 603, 604, 608, 609

[56] References Cited

U.S. PATENT DOCUMENTS

| | | | |
|---|---|---|---|
| 4,340,519 | 7/1982 | Kotera et al. | 523/414 |
| 4,474,859 | 10/1984 | Oshima et al. | 428/481 |
| 4,695,286 | 9/1987 | Vanier et al. | 427/471 |
| 4,740,497 | 4/1988 | Harrison et al. | 503/227 |
| 4,927,803 | 5/1990 | Bailey et al. | 503/227 |
| 5,006,598 | 4/1991 | Adams et al. | 524/601 |
| 5,129,947 | 7/1992 | Sharma et al. | 106/20 |

FOREIGN PATENT DOCUMENTS

| | | |
|---|---|---|
| 0177111 | 4/1985 | European Pat. Off. |
| 0503664 | 3/1992 | European Pat. Off. |
| 2504539 | 4/1981 | France |
| 60-190389 | 9/1985 | Japan |
| 01259989 | 10/1989 | Japan |

OTHER PUBLICATIONS

Polymer Bulletin, vol. 27, No. 6.

*Primary Examiner*—Paul R. Michl
*Assistant Examiner*—U. K. Rajguru
*Attorney, Agent, or Firm*—Leydig, Voit & Mayer, Ltd.

[57] ABSTRACT

A water-dispersible polyester composition for an image recording medium, comprising (1) a polyester having a glass transition temperature of not less than 40°C., a specific gravity of not less than 1.25, a value of SP of 9.5-12.0, and at least one kind of hydrophilic polar group, and which is insoluble in methyl ethyl ketone, toluene, and a mixed solvent thereof, wherein 65% by mole or more of a glycol component constituting the polyester is ethylene glycol, in a proportion of 5-50% by weight, (2) an organic compound compatible with water in a proportion of 0-20% by weight, and (3) water in a proportion of 30-95% by weight all percentages by weight being based upon the total weight of said composition containing components (1), (2) and (3). When used for an image recording layer of an image recording medium, the composition of the invention is conducive to the durability of the recorded images excellent in heat resistance, resistance to plasticizer, resistance to fingerprint, and solvent resistance.

5 Claims, No Drawings

WATER-DISPERSIBLE POLYESTER COMPOSITION FOR IMAGE RECORDING MEDIUM

TECHNICAL FIELD OF THE INVENTION

The present invention relates to a polyester resin composition for an image recording medium usable for forming images on film, paper, metal, glass, cloth, and the like.

BACKGROUND OF THE INVENTION

The image recording in the instant specification mainly refers to color hard copy recordings such as sublimation transfer, melt transfer, ink-jet printing and electrophotography, and in consideration of dispersibility with dye or pigment, dyeing properties, affinity, etc., polyesters have been used for these image recordings irrespective of recording method. For example, as a dyeable resin for dye-receiving layer of sublimation transfer image receiving paper, there are conventionally known saturated polyesters, as disclosed in U.S. Pat. No. 4,474,859, and Japanese Patent Unexamined Publication Nos. 64899/1985, 258790/1986 and 105689/1987.

When a saturated polyester soluble in organic solvents is used for forming images by sublimation transfer, melt transfer, ink-jet printing or electrophotography, it is possible to obtain high quality images superior in color density, gradation, color reproduction and sharpness, whereas when seen in terms of preservation stability of images against contamination by fingerprints, fats and oils represented by various cosmetics, and plasticizer components in eraser and vinyl chloride sheet, the polyester affected by these components leads to insufficient durability of the images obtained, and particularly, a long-term preservation gives rise to problems of color change, turbulence of images, and the like, failing to meet the requirements with respect to the properties of images.

SUMMARY OF THE INVENTION

Accordingly, an object of the present invention is to provide a water-dispersible polyester composition superior in resistance to organic solvents, fats and oils, fingerprints, and plasticizers which can cause turbulences of images formed using sublimable dyes, pigment inks, dye inks, dye toners, pigment toners, or the like.

The inventors have conducted intensive studies of water-dispersible polyester resins with the aim of achieving the aforementioned object of the present invention, and found that a water-dispersible polyester composition having the following construction is superior in preservation stability of images, which resulted in the completion of the present invention.

The present invention relates to a water-dispersible polyester composition for an image recording medium, comprising (1) a polyester having a glass transition temperature of not less than 40° C., a specific gravity of resin of not less than 1.25, a value of solubility parameter (SP) of 9.5–12.0, and at least one kind of hydrophilic polar group, and which is insoluble in methyl ethyl ketone, toluene, and a mixed solvent thereof, wherein 65% by mole or more of a glycol component constituting the polyester is ethylene glycol, in a proportion of 5–50% by weight, (2) an organic compound compatible with water in a proportion of 0–20% by weight, and (3) water in a proportion of 30–95% by weight all percentages by weight being based upon the total weight of said composition containing components (1), (2) and (3).

DETAILED DESCRIPTION OF THE INVENTION

A carboxylic acid component of the polyester (1) to be used in the present invention is exemplified by an aromatic dicarboxylic acid such as terephthalic acid, isophthalic acid, orthophthalic acid, 2,6-naphthalic acid and 1,1,3-trimethyl-3-phenylindene-4',5-dicarboxylic acid, and examples of usable dicarboxylic acids besides the aromatic dicarboxylic acid include aromatic oxycarboxylic acids such as p-(hydroxyethoxy)benzoic acid, saturated aliphatic dicarboxylic acids such as succinic acid, adipic acid, azelaic acid, sebasic acid and dodecanedicarboxylic acid, unsaturated aliphatic or allcyclic dicarboxylic acids such as fumaric acid, maleic acid, tetrahydrophthalic acid and 1,4-cyclohexanedicarboxylic acid, and tri- or tetracarboxylic acids such as trimellitic acid and pyromellitic acid can be also used in a proportion of not more than 10% by mole based on the entire acid component.

As the at least one kind of hydrophilic polar group, exemplified are metal salt of sulfonic acid, metal salt of carboxylic acid, metal salt of phosphonic acid, tertiary amine salt, quaternary amine salt and compound containing pyridine ring. Examples of the metal include alkali metals such as sodium and potassium and alkaline earth metals such as calcium. Examples of the metal salt of sulfonic acid include sulfopolycarboxylates such as 5-sodium sulfoisophthalate, 5-potassium sulfoisophthalate, sodium sulfoterephthalate, 5-tetrabutylphosphonium sulfoisophthalate and sodium sulfosuccinate, and their derivatives; sodium sulfohydroquinone and its addition product with alkylene oxide; sodium sulfobisphenol A and its addition product with alkylene oxide; addition product of 5-sodium sulfoisophthalate with ethylene oxide; and condensation product of sodium sulfosuccinate and ethylene glycol. Examples of the tertiary amine and the quaternary amine include nitrogen-containing alcohols such as N-methyldiethanolamine and 2-methyl-2-dimethylaminomethyl-1,3-propanediol and their hydrochlorides, sulfonates, sulfates and derivatives. Examples of the compound having pyridine ring include pyridine, dipicolinic acid, dihydroxypyridine, pyridinedimethanol, pyridinepropanediol and diaminopyridine, and their derivatives.

Examples of the metal salt of phosphonic acid include groups of the formulas

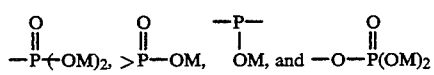

wherein M is a hydrogen or an alkali metal, and the groups are produced by reacting the compounds of the formulas

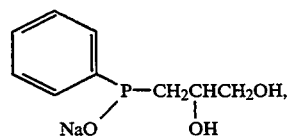

-continued

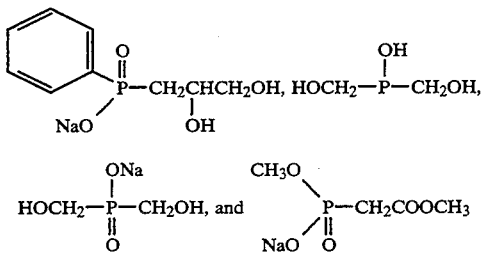

When the polyester has no hydrophilic polar group, the dispersibility of the polyester in water becomes extremely poor. In the present invention, the polyester preferably contains a hydrophilic polar group in a proportion of 1-10% by mole based on the entire acid component.

Not less than 65% by mole of the glycol component of the polyester to be used in the present invention is ethylene glycol. Examples of the glycol component other than ethylene glycol, which is to be used in a proportion of less than 35% by mole of the entire glycol component include polyethylene glycols such as diethylene glycol, triethylene glycol, propylene glycol, 1,3-propanediol, 1,4-butanediol, 1,5-pentanediol, 1,6-hexanediol, neopentyl glycol, dipropylene glycol, 2,2,4-trimethyl-1,3-pentanediol, cyclohexanedimethanol, tricyclodecanedimethylol, addition product of bisphenol A with ethylene oxide or propylene oxide, addition product of hydrogenated bisphenol A with ethylene oxide or propylene oxide, 2,2-diethyl-1,3-propanediol, and 2-n-butyl-2-ethyl-1,3propanediol, with preference given to neopentyl glycol, diethyleneglycol, polyethylene glycol, tricyclodecane dimethylol, and addition product of bisphenol A with ethylene oxide.

The polyester to be used in the present invention essentially comprises ethylene glycol in a proportion of not less than 65% by mole, preferably not less than 70% by mole relative to the entire glycol component. Where ethylene glycol is comprised in a proportion of less than 65% by mole, the polyester is easily affected by organic solvent, plasticizer and/or fats and oils, with the result that resistance to plasticizer, resistance to fingerprint, and resistance to fats and oils of the images obtained become poor.

The glass transition temperature (Tg) of the polyester is not less than 40° C., preferably 40°-70° C. When Tg is less than 40° C., heat resistance and blocking resistance of the images obtained become markedly inferior to the effect that bleeding and color change of images occur even at room temperature, thus adversely affecting the storability of the hard copy obtained.

The SP value of the polyester is 9.5-12.0, preferably 9.8-12.0. When the SP value is less than 9.5, affinity for organic solvent having a high affinity for plasticizer is enhanced to degrade durability and resistance to organic solvent, of the images obtained. On the other hand, when the SP value exceeds 12.0, affinity for water and alcohol is enhanced so that water resistance and resistance to contamination by factors besides plasticizer, such as cosmetics, become vastly low.

The specific gravity of the polyester is essentially not less than 1.25, preferably not less than 1.29. Where it is less than 1.25, preservation of the recorded images become difficult. By specifying the specific gravity of the polyester, the ratio of ethylene glycol to the entire glycol component in the polyester can be easily controlled.

That the polyester is insoluble in methyl ethyl ketone, toluene, and a mixed solvent thereof means that the polyester is not dissolved under the conditions employed for evaluating resistance to organic solvent, which are to be mentioned later. It is essential that the polyester itself or a hard copy obtained using the polyester does not completely dissolve in the organic solvents under the conditions specified in the experiment below. The insolubility in organic solvents as mentioned above is the property necessary for affording resistance to the contamination of images.

The number average molecular weight of the polyester is preferably 2000-50000.

The organic compound (2) to be used in the present invention which is compatible with water is capable of dissolving the polyester, and is exemplified by monovalent alcohols such as methanol, ethanol, n-propanol, isopropanol, n-butanol, sec-butanol and tert-butanol, glycols such as ethylene glycol and propylene glycol, glycol derivatives such as methyl cellosolve, ethyl cellosolve, n-butyl cellosolve, t-butyl cellosolve and 3-methyl-3-methoxybutanol, ethers such as dioxane, esters such as ethyl acetate, and ketones such as cyclohexanone, cyclooctanone, cyclodecanone and isophorone. Particularly preferred are n-butyl cellosolve, t-butyl cellosolve, ethyl cellosolve and isopropanol. These organic compounds compatible with water may be used alone or in combination. The boiling point of these compounds (2) is preferably in the range of from 60° C. to 200° C. When the boiling point does not reach 60° C., it is difficult to keep the temperature necessary for dissolving the polyester in said organic compound. On the other hand, the boiling point exceeding 200° C. results in inferior quick-dryability in that coating of an aqueous dispersion obtained and drying same require a long time.

The proportion of (1) a polyester, (2) an organic compound compatible with water, and (3) water is material for retaining the properties of the water-dispersible polyester composition of the present invention at a desired level.

Where the polyester (1) is comprised in the water-dispersible polyester composition in a proportion of less than 5% by weight or more than 50% by weight, the viscosity of the composition obtained becomes undesirably too low or too high. The organic compound (2) compatible with water is contained in the water-dispersible polyester composition, and can be used as a dispersing agent to aid the polyester to disperse in water, in a proportion of not more than 20% by weight based on the composition, above which proportion the dryability upon application of the composition becomes undesirably inferior.

In the present invention, the water-dispersible polyester can be mixed or reacted with other resins. The resins which may be mixed are exemplified by polyvinyl resins, polycarbonate resins, polyacrylic resins, polymethacrylic resins, polyolefin resins, cellulose derivative resins, polyether resins, polyester resins other than the polyester (1), epoxy resins and polyurethane resins.

The water-dispersible polyester to be used in the invention may be mixed with a thermosetting resin so as to improve durability of images with the help of the resin thermoset or crosslinked. Examples of the thermosetting resin concurrently used with crosslinking agent include silicone resin, melamine resin, phenol-formaldehide resin, epoxy resin and isocyanate resin. As a method for crosslinking, ionic crosslinking, radiation crosslinking, or the like is exemplified.

For improving releasability, various lubricants may be added to the composition of the invention. Such lubricants include, for example, fluororesin, silicon resin, and surfactants such as organic sulfonic acid salt, organic phosphoric acid salt and organic carboxylic acid salt.

Also, the composition of the invention may include additives such as ultraviolet absorbers, antioxidants, etc. for improving light resistance of the recorded images.

The substrate for the image-recording medium is subject to no particular limitation, and is exemplified by paper, synthetic paper, various films, various sheets, metal or glass.

The present invention is hereinbelow detailedly explained by illustrating production examples and examples wherein "part" means "part by weight" and "%" means "% by weight" unless otherwise specified.

The number average molecular weight of the polyester produced was measured by GPC, the composition of polyester was determined by $^1$H-NMR, and the glass transition temperature was measured by DSC, the results of which are shown in Table 1.

The specific gravity, SP value, heat resistance, resistance to plasticizer, resistance to fingerprint and resistance to organic solvent were measured or calculated by the following methods, and the results are shown in Table 2.

Production example of polyester

Dimethyl terephthalate (233 parts), dimethyl isophthalate (233 parts), 5-sodium sulfoisophthalate (30 parts) ethylene glycol (256 parts), diethylene glycol (146 parts), and tetrabutoxytitanate (0.5 part) were charged in an autoclave equipped with a thermometer and a stirrer, and the mixture was heated at 150°–220° C. for 4 hours for transesterification, after which the temperature of the reaction system was elevated to 250° C. in 10 minutes. The pressure of the system was gradually reduced to 0.3 mmHg or less in 25 minutes, and the mixture was allowed to react under these conditions for 1 hour to give a pale-yellow, transparent polyester A. The number average molecular weight of the polyester A obtained was 20,000. In the same manner, polyesters B–E were obtained, the details of which are shown in Table 1.

The properties of the polyester and the polyester composition were determined as follows.

(1) Specific gravity

The specific gravity of the polyesters obtained were determined by sink-float method using an aqueous solution of calcium chloride (30° C.).

(2) SP value

The SP values of the polyesters obtained were calculated by the method of Small et al.

(3) Heat resistance (percent color fading in a dark place)

An image receiving material prepared using the polyester composition to be obtained in Example 1 below, to which a cyan dye had been transferred was left standing in a dark place at 60° C. for 200 hours for aging, and the dye density before and after the heat resistance test was compared, which is shown as percent dye density retention.

(4) Resistance to plasticizer

An 80 μm-thick vinyl chloride film (1 cm$^2$) was adhered onto an image receiving material to which a cyan dye had been transferred, and a 5 g load was applied on the vinyl chloride film. The film was left standing at 40° C. for 24 hours for aging, and decoloring of the cyan dye and trace of the film were observed. They were evaluated according to the following criteria.

○: showed no trace of film on the surface of image receiving material nor decoloring Δ: showed no color change but showed trace of film X: showed color change and trace of film (5) Resistance to fingerprint Thumb was pressed hard against the surface of an image receiving material to which a cyan dye had been transferred, to leave the fingerprint on the surface of the images. The material was left standing at 40° C. for 48 hours for aging, and agglomeration of the cyan dye, decoloring and trace of the fingerprint were examined and evaluated as follows.

○: showed no trace of fingerprint on the surface of image receiving material nor color change Δ: showed no color change but showed trace of fingerprint X: showed agglomeration of the dye on the surface of images (6) Resistance to organic solvent The polyester obtained was added to a solvent of methyl ethyl ketone, toluene, or a mixture of methyl ethyl ketone: toluene=50:50 (by weight) such that the concentration of solids was 15%, and the mixture was left standing at room temperature for 48 hours. The solubility of the polyester was visually observed, and evaluated as follows.

○: system which retained polyester without complete dissolution

X: the rest

EXAMPLE 1

Polyester A (30 parts) and n-butyl cellosolve (15 parts) were charged in a container, and the mixture was stirred at 100° C. for about 3 hours to give a homogeneous, viscous and molten solution. Water (55 parts) was added thereto while vigorously stirring the solution, and about 1 hour later, a homogeneous, pale-yellow-white water-dispersible polyester composition A-1 was obtained.

The water-dispersible polyester A-1 for image receiving layer was diluted with a mixed solution of isopropanol: water=60:40 (by weight), and applied on a 150 μm-thick polyethylene terephthalate synthetic paper with a bar coater such that the thickness of the dried film became 7–10 μm. The dispersion contained a silicone-modified oil in a proportion of 8% by weight based on the resin component. Drying was conducted at 100° C. for 20 minutes. The adhesion of the film was extremely fine, and the film developed no whitening when immersed in water, indicating superior water resistance.

EXAMPLE 2

Polyester B (30 parts) and water (70 parts) were charged in a container, and the mixture was stirred at 80° C. for about 3 hours to give a homogeneous, white water-dispersible polyester composition B. In the same manner as in Example 1, a dye-receiving layer was formed and used as a specimen of Example 2.

EXAMPLE 3–5

Using polyesters C–E, dye-receiving layers were formed by a method similar to that in Example 1, and used as specimens of Examples 3–5.

Comparative Example 1

Using polyester F, a dye-receiving layer was formed by a method similar to that in Example 1, and used as a specimen of Comparative Example 1.

Comparative Examples 2-4

Using polyesters G-I, dye-receiving layers were formed by a method similar to that in Example 1, and used as specimens of Comparative Examples 2-4.

TABLE 1

| Poly-ester | Acid (molar ratio) | | | | Glycol (molar ratio) | | | | | Tg (°C.) | Mn |
|---|---|---|---|---|---|---|---|---|---|---|---|
| | TPA | IPA | CHDA | *1 | TCD | EG | DEG | NPG | PG | | |
| A | 48 | 48 | | 4 | | 75 | 25 | | | 60 | 20000 |
| B | 46 | 46 | | 8 | | 80 | 20 | | | 60 | 20000 |
| C | 48 | 50 | | 2 | | 65 | | | 35 | 64 | 21000 |
| D | 80 | 14 | | 6 | | 80 | 10 | 10 | | 65 | 20000 |
| E | 48 | 48 | | 4 | 20 | 80 | | | | 70 | 18000 |
| F | 48 | 48 | | 4 | | 50 | 50 | | | 30 | 20000 |
| G | 43 | 43 | 10 | 4 | 90 | 10 | | | | 75 | 21000 |
| H | 25 | 21 | 50 | 4 | | 80 | | | 20 | 15 | 22000 |
| I | 50 | 48 | | 2 | | 50 | 50 | | | 65 | 18000 |

In Table 1, each abbreviation stands for the following:
TPA: terephthalic acid
IPA: isophthalic acid
CHDA: cyclohexanedicarboxylic acid
*1: 5-sodium sulfoisophthalate
TCD: tricyclodecanedimethylol
EG: ethylene glycol
NPG: neopentyl glycol
DEG: diethylene glycol
PG: propylene glycol

TABLE 2

| | Specific gravity | SP value | Heat resistance | Resistance to plasticizer | Resistance to fingerprint | Solvent resistance | | |
|---|---|---|---|---|---|---|---|---|
| | | | | | | M | T | M/T |
| Ex. 1 | 1.35 | 10.7 | 95% | ○ | ○ | ○ | ○ | ○ |
| Ex. 2 | 1.37 | 10.7 | 95% | ○ | ○ | ○ | ○ | ○ |
| Ex. 3 | 1.34 | 10.2 | 97% | ○ | ○ | ○ | ○ | ○ |
| Ex. 4 | 1.36 | 10.7 | 98% | ○ | ○ | ○ | ○ | ○ |
| Ex. 5 | 1.30 | 10.1 | 99% | ○ | ○ | ○ | ○ | ○ |
| Com. Ex.1 | 1.34 | 10.1 | 55% | Δ | Δ | x | x | x |
| Com. Ex.2 | 1.20 | 9.7 | 99% | x | x | x | x | x |
| Com. Ex.3 | 1.24 | 10.7 | 40% | x | x | x | x | x |
| Com. Ex.4 | 1.26 | 10.0 | 98% | Δ | Δ | x | x | x |

In Table 2, M stands for methyl ethyl ketone, T stands for toluene, and M/T stands for a mixed solvent of methyl ethyl ketone/toluene.

When used for an image recording layer of an image recording medium, the water-dispersible polyester composition of the present invention which comprises 65% by mole or more of a glycol component in a polyester having a hydrophilic polar group, and a particular glass transition temperature, specific gravity, SP value and solubility in organic solvent, is conducive to the durability of the recorded images excellent in heat resistance, resistance to plasticizer, resistance to fingerprint, and solvent resistance.

What is claimed is:

1. A water-dispersible polyester composition for an image recording medium, comprising (1) a polyester having a glass transition temperature of not less than 40° C., a specific gravity of not less than 1.25, a value of SP of 9.5-12.0, and at least one kind of hydrophilic polar group, and which is insoluble in methyl ethyl ketone, toluene, and a mixed solvent thereof, wherein 65% by mole or more of a glycol component constituting the polyester is ethylene glycol, in a proportion of 5-50% by weight, (2) an organic compound compatible with water in a proportion of 0-20% by weight, and (3) water in a proportion of 30-95% by weight, all percentages by weight being based upon the total weight of said composition containing components (1), (2) and (3).

2. The composition of claim 1, wherein the hydrophilic polar group is contained in a proportion of 1-10% by mole based on the entire acid component in the polyester (1).

3. The composition of claim 1, wherein not less than 70% by mole of the glycol component constituting the polyester (1) is ethylene glycol.

4. The composition of claim 1, wherein the glass transition temperature of the polyester (1) is 40°-70° C.

5. The composition of claim 1, wherein the specific gravity of the polyester (1) is not less than 1.29.

* * * * *

UNITED STATES PATENT AND TRADEMARK OFFICE
CERTIFICATE OF CORRECTION

PATENT NO. : 5,446,082
DATED : AUGUST 29, 1995
INVENTOR(S) : ASAI ET AL.

It is certified that error appears in the above-identified patent and that said Letters Patent is hereby corrected as shown below:

In Column 2, line 19 "allcyclic" should read --alicyclic--.

Signed and Sealed this

Thirtieth Day of January, 1996

Attest:

BRUCE LEHMAN

Attesting Officer

Commissioner of Patents and Trademarks